United States Patent [19]

Yoshida et al.

[11] 4,169,911
[45] Oct. 2, 1979

[54] POROUS CARBON FIBER MATERIAL WITH A THIN METAL FILM COVERING EACH FIBER

[75] Inventors: Kazuo Yoshida; Shinsaku Tada; Atsushi Kitamura, all of Otsu, Japan

[73] Assignee: Toray Industries, Inc., Tokyo, Japan

[21] Appl. No.: 900,184

[22] Filed: Apr. 26, 1978

[30] Foreign Application Priority Data

May 10, 1977 [JP] Japan .................................. 52-53443

[51] Int. Cl.² ............................................. D04H 1/58
[52] U.S. Cl. ..................................... 428/36; 428/131; 428/288; 428/297; 428/378; 428/379; 428/389; 428/408
[58] Field of Search ............... 428/288, 297, 378, 389, 428/408, 379, 131, 36

[56] References Cited

U.S. PATENT DOCUMENTS

| | | | |
|---|---|---|---|
| 3,573,086 | 3/1971 | Lambden | 428/408 |
| 3,953,647 | 4/1976 | Brennan et al. | 428/378 |
| 4,064,207 | 12/1977 | De Crescente | 428/408 |

FOREIGN PATENT DOCUMENTS 1215002 12/1970 United Kingdom ..................... 428/389

*Primary Examiner*—James J. Bell
*Attorney, Agent, or Firm*—Miller & Prestia

[57] ABSTRACT

Porous material comprising a plurality of intersecting cut carbon fibers each having a diameter of 3 to 20 microns, the fibers being covered with a thin metal film and being substantially completely and randomly dispersed accumulated and bound with a binder at portions of the intersections of the fibers, to form a porous structure through which a plurality of pores extend continuously from one surface of the material to the other.

15 Claims, 4 Drawing Figures

POROUS CARBON FIBER MATERIAL WITH A THIN METAL FILM COVERING EACH FIBER

BACKGROUND OF THE INVENTION

This invention relates to a porous material made up of a plurality of carbon fibers, particularly cut carbon fibers. More particularly, this invention relates to a porous carbon fiber material comprising cut carbon fibers covered with a thin metal film to form a material which may be formed into a plate or mat useful as an electrode substrate for a battery, or electrolytic electrode, a current collector, a filter material such as a magnetic filter, a mist separator, fins of a thermal radiator, and as a catalyst support, for example.

The porous material of this invention is useful, for example, as a support in the form of an electrode substrate which supports the active anodic and cathodic materials of a battery. The porous material is also useful for flow-through electrodes such as electrolytic electrodes or current collectors, and for flow-through elements such as filters including magnetic filters, mist separators and fins of thermal radiators. Moreover, it is advantageous for use in both support and flow-through elements such as supports for catalysts, for example.

The prior art discloses porous materials used for such purposes. Matted materials have heretofore been known, composed of entangled carbon fibers plated with metal. However, in such matted materials the carbon fibers are not well dispersed and so-called fiber bundles are present in which many individual fibers are aggregated or bundled together and are all oriented in the same direction, forming a unidirectional bundle. In such materials the metal is plated only upon the outer surface of the fiber bundle but not upon the carbon fiber surfaces in the interior of the bundle. Even if the metal is plated in the inner portions of the fiber bundles, it serves only to cause the individual carbon fibers to stick together, thus providing the equivalent of a very thick single fiber.

Porous materials composed of thick individual fibers have several disadvantages, as follows:

(A) The available surface area of the porous material is small, and accordingly disadvantageous in use, especially as a flow-through electrode.

For example, the outer surface area of a fiber bundle formed of one hundred individual fibers is less than one-tenth of the sum of the surface areas of one hundred independent individual fibers. On the other hand, as the aforementioned surface area becomes larger, the activation polarization and concentration polarization of an electrolytic electrode become smaller, and the collecting efficiency of the current collector becomes higher. Accordingly, the available surface area should be as great as possible.

(B) The mesh of the porous material is so coarse that it is disadvantageous for use as a supporting device or as a flow-through element. The size of the mesh of such a porous material can be expressed in terms of the average distance between one point of fiber intersection to a neighboring point of fiber intersection. This average distance is known to be nearly proportional to the diameter of the fiber. Therefore any substantial coarsening of the fiber diameter by aggregation of single fibers is very significant since it makes the mesh of the porous material undesirably larger. The larger the mesh of the porous material, the lower its ability to maintain its shape and strength as a support, the lower its current collecting efficiency when used as a current collector, and the lower the contact probability when used as a flow-through element with a fluid.

(C) It is disadvantageous to use the (thick-fiber) porous material as an electrode because of its low electrical conductivity.

When thick fibers exist, the number of contact points with the other fibers decreases. As a result, the electrical conductivity of the porous material is lower. For use as an electrode, electrical conductivity is required to be as high as possible.

(D) The porosity (of a thick-fiber material) is so low that the porous material is unsuitable for both support and flow-through uses; that is, when the porosity is low, the support can offer only a small amount of active substance per unit of fiber and its weight efficiency is reduced. When used as an electrolytic electrode, activation polarization and concentration polarization become excessive, which hinders electrode performance. When used as a flow-through electrode, the fluid resistance of the plate or mat increases.

(E) The (thick-fiber) porous material is not uniform, and is accordingly unsuitable for use as a flow-through element. If the porous material is not uniform, rectification of the fluid is largely disturbed. Also, it becomes difficult to attain uniform distribution of current velocity. Moreover, the fluid cannot flow smoothly, which causes an increase of fluid resistance.

On the other hand, German Pat. No. 2,204,752 describes a porous material which is made by plating nickel on a fleece of graphite fibers, where the diameter of the graphite fiber is 100 to 400 microns and is very coarse. However, in the fleece as in the aforementioned mats, the fibers are not dispersed enough, and additionally they use such thick graphite fibers that they have all the aforementioned disadvantages (A)–(E).

BRIEF SUMMARY OF THE INVENTION

An object of this invention is to provide a porous material of carbon fibers that is useful as a support for a product such as an electrode substrate of a battery.

Another object of this invention is to provide a porous material of carbon fibers that is useful as a flow-through element such as an electrolytic electrode, a current collector or a magnetic filter.

A further object of this invention is to provide a porous material of carbon fibers that is useful as both a support and as a flow-through element.

Other and further objects of this invention will become apparent from the explanations which follow.

According to this invention, to attain the aforementioned objects there is provided a porous material which comprises a plurality of cut carbon fibers having a diameter of 3 to 20 microns, said cut fibers being substantially completely and randomly dispersed and accumulated with individual fibers intersecting each other, a binder uniting each of said fibers at their points of intersection to form a porous structure having a multiplicity of pores which extend continuously from one surface of the material to the other, and a thin metal film covering each of said fibers. The carbon fibers have short lengths, and are preferably cut carbon fibers; they are preferably layered over one another to provide a plate or mat.

DETAILED DESCRIPTION OF THE INVENTION

In this invention, where reference is made to the fact that the cut carbon fibers are substantially completely dispersed, this either means that no fiber bundles are present in the material or that any fiber bundle present consists of 2 to 10 cut carbon fibers pointing in the same direction and, in addition to this, that the content of such fiber bundles is under 5% of the total volume of porous material.

Porous material in which the cut carbon fibers are not substantially completely dispersed should not be used, because such porous material possesses the aforementioned disadvantages (A)-(E).

In the description of this invention, the term "carbon fiber" is intended to include any of the fibers that are made by carbonizing organic fibers such as cellulose fibers, acrylic synthetic fibers, polyvinyl alcohol synthetic fibers, and others. The term "carbon fiber" includes graphite fibers which are composed of almost pure carbon, and which contain more than 98 percent of carbon.

Figure 1:
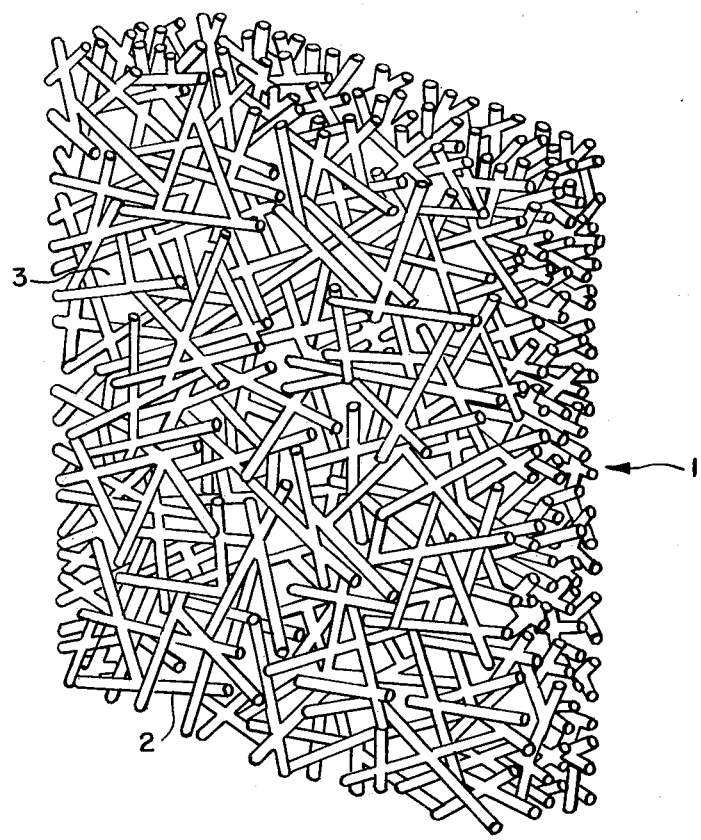
FIG. 1 is a conceptional perspective view of one embodiment of a porous carbon fiber material of this invention.

One embodiment of a porous material of this invention is shown in FIG. 1 of the drawings.

In FIG. 1, the porous material is generally indicated by the numeral 1. It comprises a multiplicity of the individual fibers, each randomly arranged but all in substantially a direction parallel to a common plane. As appears at the right-hand portion of FIG. 1, there are several thicknesses of fibers shown, thus producing a plate-like or mat-like product capable of having enough strength to be self-supporting. The porous material there shown is composed of cut carbon fibers covered with a thin metal film. The lengths of the cut carbon fibers are almost the same and their diameter is 3 to 20 microns. Each of the cut carbon fibers is randomly dispersed substantially parallel to a two-dimensional plane with the fibers overlapping each other to form pores that extend continuously from one surface of the material to the other.

The expression "substantially parallel to a two-dimensional plane" is intended to mean that the angle between the axis of the cut carbon fiber and the two-dimensional plane is less than 30 degrees, preferably less than 15 degrees. Generally the porous material forms a plate-like or mat-like shape.

Figure 2:
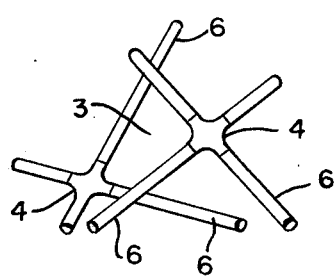
FIG. 2 is a fragmentary, enlarged view of a portion of the material appearing in FIG. 1, showing the appearance of the cut carbon fibers and how they are bound together.
Figure 3:
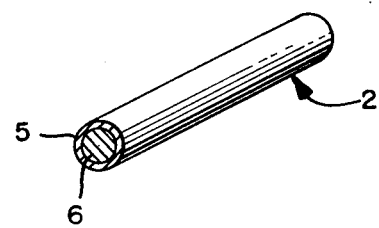
FIG. 3 is a conceptional perspective view wherein the cut carbon fiber is covered with a thin metal film in accordance with this invention.

As is illustrated in FIG. 2, the cut carbon fibers are connected to each other by a binder 4 at portions of the intersections of the fibers, thus forming the fibers into a unitary mass. Moreover, each cut carbon fiber is covered with a thin metal film 5, as illustrated in FIG. 3.

The lengths of the cut carbon fibers are preferably in the range of 2~50 (mm), and preferably all of them have approximately the same length. When the cut fibers are shorter than 2 mm, they act more like powders than fibers. Therefore, they tend to pile up too densely, with resultant porosity decrease. On the other hand, when the cut fibers are longer than 50 mm, they become entangled easily and it is very difficult to disperse them substantially completely.

It is advantageous to use fine carbon fibers having a diameter of 3~20 ($\mu$) and to disperse them substantially completely, since this significantly increases the surface area of the porous material. For example, as the degree of contact between the fluid and the electrode increases, the activation polarization and concentration polarization of an electrolytic electrode and the current collecting efficiency of the current collector improve. The porous material of this invention is highly suitable for these uses since it has a very large surface area. The increase of the number of points of contact between the fibers makes the electrical conductivity of the material greater, which is also highly desirable for use as an electrode.

In addition it is advantageous to use very fine cut fibers whose diameter is 3~20 ($\mu$), while substantially completely dispersing them. This makes a fine mesh size porous material. As described, it is desirable to provide a fine porous material, because this facilitates support for support materials, and also increases the current collecting efficiency and the contact probability of a flow-through device. For example, when used as a current collector, the charges generated in the active material flow as a current in the neighboring fibers. In this process, the charges generated in the active material in this current path also add to the current. Therefore, as the current path becomes longer, the current increases acceleratively causing a large voltage drop. The coarser the mesh of the porous material, the longer the current path. Accordingly, it is especially important for the mesh of the material to be fine in order to avoid increasing the voltage drop. When used as an electrolytic electrode, the electrolyte undergoes an electrochemical reaction. However, only a small part of the electrolyte that comes very near to the fibers really undergoes such electrochemical reaction. Other portions of the electrolyte, which do not come into the neighborhood of the fibers, flow out from the electrode without undergoing any substantial electrochemical reaction. As a result, the efficiency of the electrode decreases. When the mesh of the porous material is coarse, such electrolyte that escapes from the electrode increases.

The porosity of the porous material of this invention is very high, such as 80 to 98% porosity. Such high porosity can essentially be obtained by opening the cut fibers substantially perfectly. High porosity is beneficial since it enables the material to support a greater amount of material when used as a support, and to cause the fluid to flow smoothly when used in this manner. Moreover, when used as an electrolytic electrode, the efficiency increases, since the contact of the electrolyte with the electrode is improved, and because undesirable effects such as activation polarization and concentration polarization are suppressed.

A further advantage of the concept of substantially completely dispersing cut carbon fibers to form the plate or mat is that when the material is used as a flow-through element, the fluid rectifying performance of the material is improved, and uniform distribution of flow velocity is achieved.

Flow resistance is also decreased by reason of smooth movement of the fluid.

The binders that adhere the cut carbon fibers together to form a unitary mass include phenolic resins, epoxy resins, furan resins, xylenol-formaldehyde resins, urea resins, melamine resins, aniline-formaldehyde resins, Friedel-Crafts resins, unsaturated-polyester resins, polyvinylalcohol, polyacrylic resin, polyvinylbutyral, polyvinylpyrrolidone, polyvinylacetate, polystyrene, polyisobutylene, and others. These may be used with or without solvent, as desired. When a binder is used, it preferably comprises 2~50 weight percent, based upon the total weight of the cut carbon fibers. When the amount of the binder is less than 2% by weight, the cut carbon fibers are not adhered strongly enough. When the amount of the binder is more than 50% by weight, there is a danger that the binder will block the pores, and thus decrease porosity. Further, it sometimes occurs that too much binder makes it difficult for the cut carbon fibers to become substantially completely covered with metal.

The metal used for forming thin metal film is an electrically conductive metal selected from the group consisting of nickel, iron, cobalt, platinum, gold, silver, copper, palladium, rhodium, rhenium, lithium, aluminum, bismuth, beryllium, lead, zinc, tin, chromium, titanium, vanadium, molybdenum, niobium, tungsten, tantalum, cadmium, indium, manganese, tellurium, antimony, selenium, germanium, silicon, and alloys composed of at least one of said metals as a main component. To cover the cut fibers with the metal is necessary in order to improve the electrical conductivity of the porous material and often provides the further advantage of holding the shape of the product by reinforcing the strength of the cut carbon fibers.

According to the desired end use of the porous material, the suitable metal or alloy may be selected. For example, when the material is to be used as an electrode substrate for use in batteries, nickel is suitable. When used as electrolytic electrodes, platinum, gold and silver are suitable. When used as magnetic filters, nickel, cobalt and iron are suitable.

The thickness of the metal is not more than 10 microns. When thicker, the diameter of the fibers becomes too large, which causes the same disadvantage as when fiber bundles exist.

The cut carbon fibers can be covered with the metal by any of various methods, such as electrochemical plating, chemical plating, vacuum deposition, sputtering, ion plating, plasma jet application or chemical vapor deposition, for example. Electrochemical plating is preferably used for the reason that it is easy to plate the metal on those portions of the fibers which are located in the interior of the porous material. Further, electrochemical plating is cheaper and is used widely in industry.

In the explanations above, reference has been made to a porous material of plate-like shape. However, the shape of the material can be altered according to its intended use. For example, when used as flow-through electrodes or catalyst it may be beneficial to use a shape in the form of a cylinder or column of the porous material. For use as an electrode substrate or as a magnetic filter, a plate-like shape is often suitable.

In the above explanation, the cut carbon fibers have been referred to as piled up in such a manner that their axes are arranged substantially parallel to a two-dimensional plane. This is especially suitable for use as a magnetic filter. This is for the reason that in a magnetic filter, only that component of magnetic field which is perpendicular to the fiber can act effectively. Therefore, by so arranging the porous material that its plate-like surface is perpendicular to the magnetic field, can maximum separation efficiency be achieved. However, in connection with other uses, generally speaking, the cut carbon fibers may be oriented arbitrarily with respect to direction.

A method of making porous material according to this invention is, for example, as follows:

Carbon fibers are cut into cut fibers, and are piled on a net utilizing their own weight in conjunction with an air jet. Then the binder is distributed on the pile, and the product is passed through a pair of hot rollers in order to provide the desired thickness. During this process, the binder is solidified and the surface of the pile is smoothed. Next, a metal is plated on the cut carbon fibers by electroplating.

As hereinbefore described, the porous material of this invention comprises cut carbon fibers having a diameter of 3 to 20 microns which are substantially completely dispersed. Therefore, the surface area, used effectively as a porous material, increases enormously. Accordingly, the porous material of this invention is useful as a flow-through element such as an electrolytic electrode or a current collector. Since the mesh of the porous substance is fine, its performance as a supporting material, current collecting efficiency as a current collector and its contact probability with fluids are all sharply improved. The porous material of this invention is useful not only as a support but also as a flow-through element. The number of the points of contact of cut carbon fibers is also radically increased, so that the electrical conductivity of the porous material is also increased. Thus the porous material of this invention is especially useful as an electrode.

In addition, since the cut carbon fibers of the porous material of this invention are substantially completely dispersed a high porosity can be obtained, which produces highly desirable results such as an increase of the amount of supported material in the support, improvement of weight efficiency, supression of activation polarization and concentration polarization of electrolytic electrodes, improvement of the performance of an electrode, or decrease of fluid resistance of a flow-through element. Moreover, since the porous material of this invention is uniform, it is useful as a flow-through element; the performance of rectification is improved, a uniform distribution of flow velocity is obtained and fluid resistance is decreased by smooth movement of fluid.

In the carbon fiber porous material of this invention, the cut fibers are adhered to each other at some of their intersections to form the fibers into a unitary mass; each cut fiber is further covered with thin metal film. Therefore, the porous material easily holds its own shape, and is prevented from deforming by the weight of supported material when used as a support or by the fluid pressure when used as a flow-through element.

The following Examples are illustrative of the invention, but are not intended to limit the scope of the invention, which is defined in the appended claims.

EXAMPLE 1

Carbon fibers having a elipsoidal cross section of 6×8 ($\mu$), and an average diameter of 7 ($\mu$) were cut into cut fibers 15 (mm) long, and were piled on a net utilizing their own weight, and an air jet. Then an aqueous emulsion of phenolic resin was distributed on this pile of cut fibers. Passing this pile through a pair of hot rollers, the binder was solidified and the surface of the pile was smoothed. The plate-like or mat-like material ("plate" hereafter) obtained was 30 (g/m$^2$) in weight and 1.0+0.1 (mm) thick. By entirely the same process, another plate was obtained.

The two aforementioned plates were immersed in a bath for the purpose of nickel plating. Setting a plate of nickel as a counter anode, and the aforementioned plates as cathodes, nickel was plated on the plates, using a current density of 1 (A/dm$^2$). The size of the plate immersed in the bath was 5×5 (cm). The electrolyte was composed of nickel sulfide 150 g/l, ammonium chloride 15 g/l, boric acid 15 g/l, and its pH was 5.6~5.8.

The porosity of the porous material of carbon fibers covered with nickel was 94 (%). Its weight was 600 (g/m$^2$), and its resistivity was $0.7 \times 10^{-3}$ (ohm·cm). Then this porous material was cut into pieces 2×3 (cm), and a lead wire (copper wire) was soldered on one of the shorter edges, and after this, thin porous material was sealed by epoxy resin remaining part positioned 2 (cm) from the other shorter edge. Thus, an electrode substrate was made. One of these electrode substrates was immersed in a 3.5 (mol/l) aqueous solution of nickel nitrate. Using a plate of nickel as an anodic counter electrode, the said electrode substrate was cathodically polarized for 12 hours at a current density of 25 (mA/cm$^2$). And further, the said electrode substrate was polarized in a 5 N aqueous solution of potassium hydroxide, for 1 hour at a current density of 50 (mA/cm$^2$).

Another electrode substrate was immersed in a 4.5 (mol/l) aqueous solution of cadmium nitrate. Using a plate of cadmium as a counter anode, the said electrode substrate was cathodically polarized for 4 hours at a current density of 15.5 (mA/cm$^2$). In order to prevent the diffusion of the gas generated during electrolysis, a separator made of polyvinyl chloride having fine pores was utilized. On the anodic cell, great amounts of powders of cadmium oxide were suspended. After this electrolysis, the said plate was polarized in a 5 N solution of potassium hydroxide for 1 hour at a current density of 15 (mA/cm$^2$), and then part of the cadmium hydroxide changed to metallic cadmium. These two kinds of electrodes, nickel electrode and cadmium electrode, were electrochemically formed in an aqueous solution of potassium hydroxide having a specific gravity of 1.25 for 20 hours at a current density of 50 (mA). After rinsing and drying them, their weights were measured. The amount of filling of the active material was 1.9 (g/cm$^3$) in the nickel electrode, and 1.33 (g/cm$^3$) in the cadmium electrode. By measuring the capacity of these two electrodes in a single electrode method, it was found that they had excellent properties for use as electrode substrates for a storage battery whose anode was a nickel anode and whose cathode was a cadmium cathode.

EXAMPLE 2

By exactly the same process as Example 1, exactly the same plate-like substance of carbon fibers was made. Platinum was plated on this plate, and a porous material of carbon fibers covered with platinum was obtained. Its basic weight was 650 (g/m$^2$), and the average diameter of the cut fibers of carbon fiber covered with platinum was about 12 ($\mu$). In order to test the said porous material as an electrolytic electrode, it was cut into a round shape, and its circumference was sealed with epoxy resin. This was utilized as a working electrode, whose effective area was 0.79 (cm$^2$). The working electrode was set in a glass tube having an inside diameter of 10 (mm) in order that the plane of the working electrode was perpendicular to the cylindrical axis of the glass tube. A 0.1 (mol/l) aqueous solution of sulfuric acid containing 0.01 (mol/l) copper sulfate flowed through this glass tube at a velocity of 21 (ml/min). Setting a counter electrode of platinum in this glass tube, the relation between electrode current and electrode potential of electrolysis of the working electrode was measured. The result of this measurement is indicated by curve (A) in FIG. 4.

To compare with the result above, the same measurement was made utilizing as a working electrode a platinum net comprising platinum wires having a diameter of 80 ($\mu$). The basis weight of this platinum net was 650 (g/m$^2$), and was the same as that of the said porous material of carbon fibers covered with platinum. The result of this measurement is indicated by curve (B) in FIG. 4.

Figure 4:
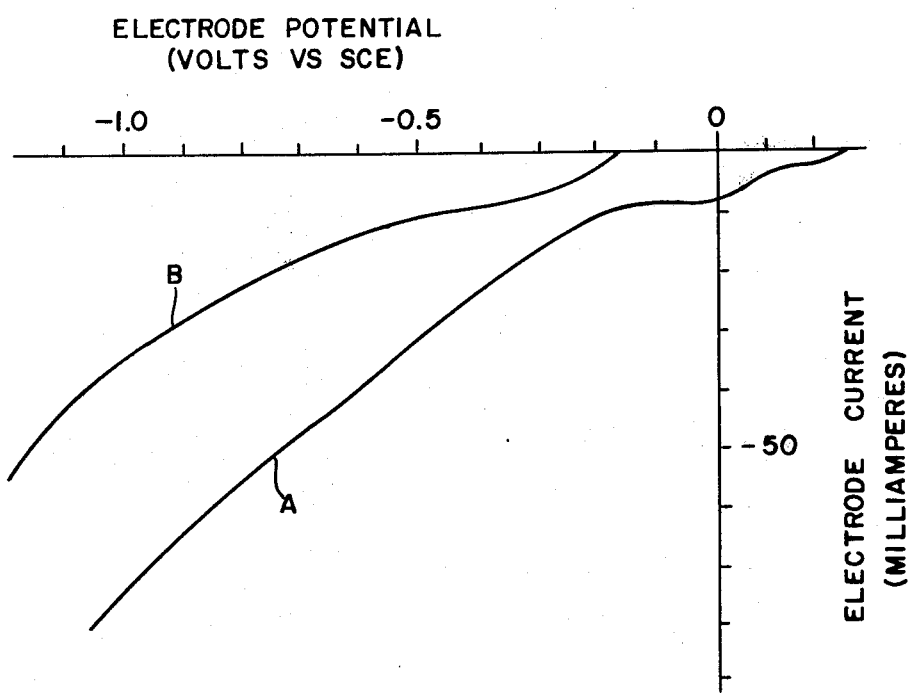
FIG. 4 is a graph showing current-potential electrolysis curves which are obtained by using as electrolytic electrodes the porous carbon fiber material of this invention as compared to a net of platinum wire.

As is apparent from FIG. 4, the current density of the working electrode utilizing the porous material of this invention was greater than that of the working electrode utilizing the platinum net. This is mainly because the diameter of the cut carbon fibers of the porous material of this invention was about 12 ($\mu$), and was much finer than that of the platinum wire which had a diameter of 80 ($\mu$).

We claim:

1. A porous carbon fiber material comprising a multiplicity of cut carbon fibers having a diameter of 3 to 20 microns, said fibers being substantially completely and randomly dispersed with the fibers overlaid and intersecting each other, a binder contacting said fibers at their points of intersection to form a porous structure including a multiplicity of pores which extend continuously from one surface of said material to the other, said binders being selected from the group consisting of phenolic resin, epoxy resin, furan resin, xylenol-formaldehyde resin, urea resin, melamine resin, aniline-formaldehyde resin, Friedel-Crafts resin, unsaturated polyester resin, polyvinylalcohol, polyacrylic resin, polyvinylbutyral, polyvinylpyrrolidone, polyvinylacetate, polystyrene and polyisobutylene, and a thin metal film covering each of said fibers.

2. The porous material as defined in claim 1, wherein each of said fibers is randomly dispersed substantially parallel to a two-dimensional plane.

3. The porous material as defined in claim 1, wherein the length of said carbon fibers is 2 to 50 mm.

4. The porous material as defined in claim 1, wherein the amount of said binder is 2 to 50 weight percent, based upon the total weight of said fibers.

5. The porous material defined in claim 1, wherein the metal of said thin film is selected from the group consisting of nickel, iron, cobalt, platinum, gold, silver, copper, palladium, rhodium, rhenium, lithium, aluminum, bismuth, beryllium, lead, zinc, tin, chromium, titanium, vanadium, molybdenum, niobium, tungsten, tantalum, cadmium, indium, manganese, tellurium, antimony, selenium, germanium, silicone and alloys containing one of said metals as a main component.

6. The porous material defined in claim 1, wherein the thickness of said thin metal film is 10 microns or less.

7. The porous material defined in claim 1, wherein the total volume of said pores is 80 to 98 percent of the total volume of said porous material.

8. The porous material defined in claim 1, in the form of a mat having parallel, spaced apart, smooth surfaces.

9. The porous material defined in claim 1, wherein each of said fibers is substantially independent and free from agglomeration with its neighbors.

10. The porous material defined in claim 9, wherein each of said fibers is substantially completely and substantially uniformly covered with said thin metal film.

11. The porous material as defined in claim 1, wherein said porous material is in a sheet-like form.

12. The porous material as defined in claim 1, wherein said porous material is in a cylindrical form.

13. The porous material as defined in claim 1, wherein said porous material is in a column-like form.

14. A mat composed of the porous material as defined in claim 1, said mat being arranged substantially along a plane, wherein the angle between the carbon fibers and the plane of the mat is less than 30 degrees.

15. The mat defined in claim 11, wherein said angle is less than 15 degrees.

* * * * *